April 13, 1937. C. L. CLAFF Re. 20,332

BOX CONSTRUCTION

Original Filed Aug. 3, 1934 2 Sheets-Sheet 1

C. L. Claff

Inventor

By Chas. Thorowgood

Attorneys.

April 13, 1937. C. L. CLAFF Re. 20,332

BOX CONSTRUCTION

Original Filed Aug. 3, 1934 2 Sheets-Sheet 2

C. L. Claff
Inventor

By C. A. Snow & Co.
Attorneys.

Reissued Apr. 13, 1937

Re. 20,332

UNITED STATES PATENT OFFICE 20,332

BOX CONSTRUCTION

Clarence L. Claff, Randolph, Mass.

Original No. 2,008,608, dated July 16, 1935, Serial No. 738,359, August 3, 1934. Application for reissue February 1, 1937, Serial No. 123,544

4 Claims. (Cl. 93—58)

This invention relates to boxes of that type made from box-board material.

For the purpose of reinforcing box-board material and at the same time imparting a well finished appearance to the completed box, it has been the practice usually to provide the material with an outer covering of paper folded over all edges of the box. This covering has added greatly to the cost of every box. Cheaper boxes have been provided without the outer covering of paper for use where the appearance is not the important factor but boxes thus made have not possessed the requisite strength because the cheaper grades of box-board material are easily torn.

Various means have been devised heretofore for reinforcing boxes of this kind. For example the edges have been bound with paper tape and, in some instances, threads have been extended around the boxes and held in place by lengths of tape. These reinforcing means, while effective to a certain extent, have added objectionably to the cost of boxes where the primary purpose is to make the boxes as cheaply as possible. Consequently the production of a durable box at the lowest desirable cost without the outer covering of paper has not heretofore been possible.

It is an object of the present invention to produce a box of box-board material at what is believed to be the lowest possible cost where speed of manufacture and strength are desirable features.

It is a further object to utilize box-board material only in the formation of the greater portions of the box, there being a novel arrangement of paper tape better known in the art as "Kraft tape" whereby the produced box will be reinforced at its corners against tearing.

It is a further object to construct the boxes by a method whereby they can be produced rapidly and at low cost.

With the foregoing and other objects in view which will appear as the description proceeds, the invention consists of certain novel details of construction and combinations of parts and in certain steps of the method hereinafter more fully described and pointed out in the claims, it being understood that changes may be made in the construction and arrangement of parts and in the disclosed method without departing from the spirit of the invention as claimed.

In the accompanying drawings the preferred form of the invention has been shown.

In said drawings

Figure 1:
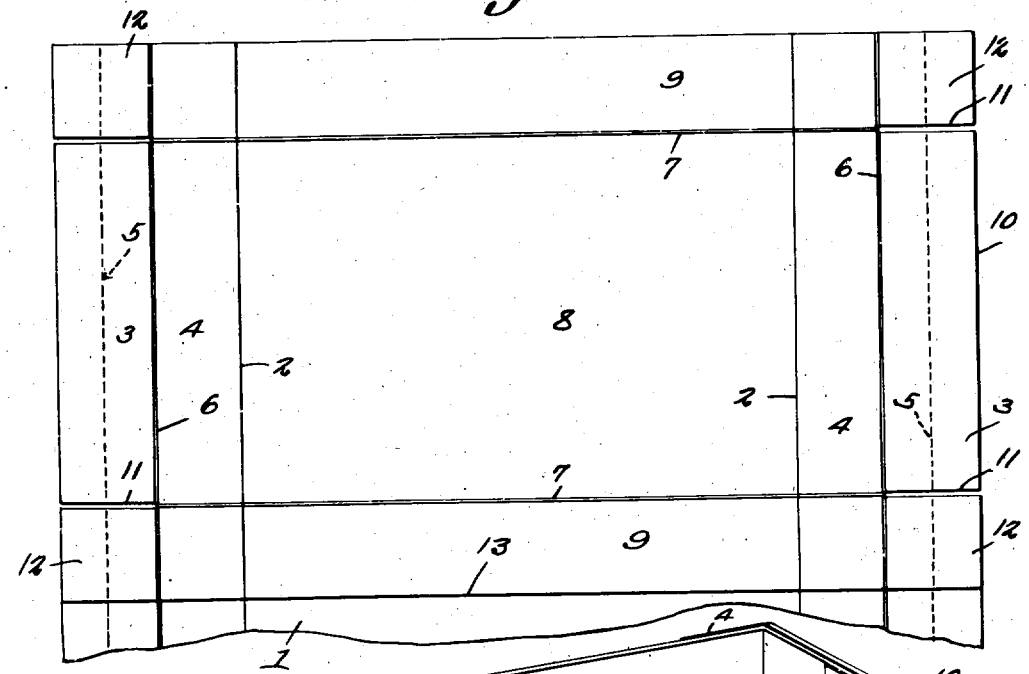
Figure 1 is a plan view of one end portion of a web of box-board material with the reinforcing tape applied thereto, a completed box blank being formed at the end of the tape.
Figure 2:
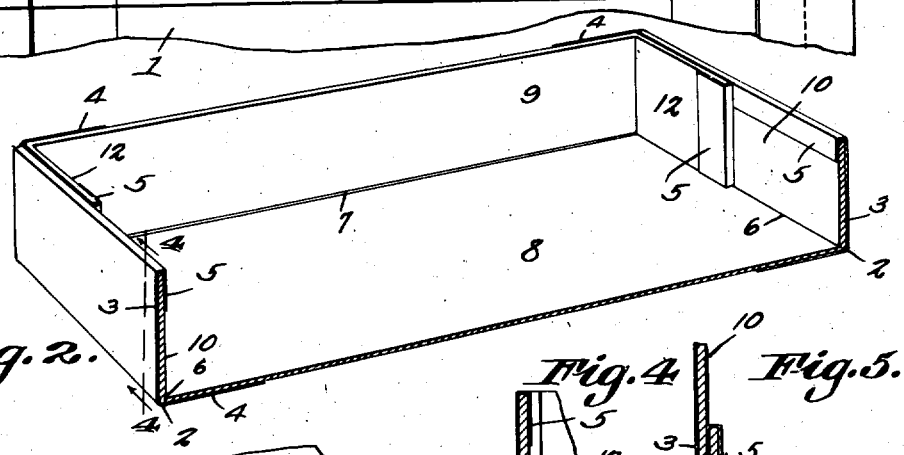
Figure 2 is a perspective view of a portion of a box formed from the blank illustrated in Figure 1.
Figure 3:
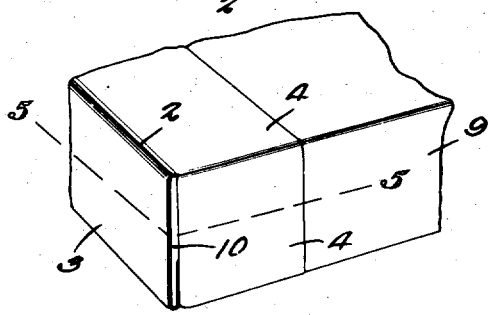
Figure 3 is a perspective view showing the outer surface of one corner portion of the completed box.
Figure 4:
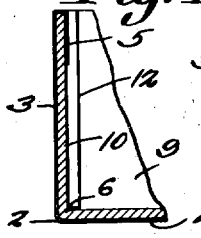
Figure 4 is a section on line 4—4, Figure 2.
Figure 5:
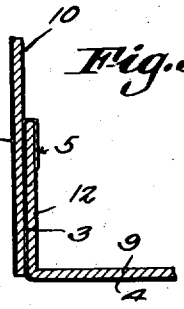
Figure 5 is a section on line 5—5, Figure 3.

In making the boxes herein described there is used a continuous web 1 of box-board material which can be of any grade desired although, by following the method herein described, the cheapest grades can be used. To the longitudinal or side edges of this web 1 are applied strips of adhesive tape indicated at 2, this tape being preferably of that type known to the trade as "Kraft tape" which is formed of a very tough paper having a strong quick drying adhesive on one surface. The tape used is of a width greater than the height of the walls of the box to be made so that there will be enough material in each tape not only to cover the outer surface of the reinforced wall but also to extend a short distance along the bottom of the box at one end while the other edge portion of the tape can be folded over the free top or longitudinal edge of the wall. In the drawings that portion of the tape covering and reinforcing the outer surface of the wall has been indicated at 3 while that portion affixed to the bottom of the box has been indicated at 4. The other edge portion of the tape which is folded inwardly to reinforce the top edge of the wall has been shown at 5.

After the tape has been applied to the opposed edge portions of the web 1 the said web is scored or creased longitudinally as at 6 and transversely as at 7 so as to define the bottom portion 8 of the box, side flaps 9 and end flaps 10. Thereafter the end flaps are cut transversely in line with the scores or creases 7, the slots 11 thus produced extending from the outer free edges of the flaps 10 to the adjacent longitudinal scores or creases 6. Thus wings 12 constituting extensions of the flaps 9 are divided from the end flaps 10.

The complete blank for the box is severed from the web 1 along the transverse line 13 and said blank is then shaped by a suitable former so that wings 12 at each end of the box will be extended toward each other while the end flaps 10 and the side flaps 9 will extend upwardly from the bottom portion 8. The end flaps 10 are affixed to the wings 12 to complete the formation of the box.

It will be noted that the outer surface of each end flap 10 forming the end wall of the box is completely covered by the portion 3 of tape 2. Thus said end wall or flap is reinforced throughout its area by this tape and the reinforcement also extends along the adjacent portion of the bottom 8 to which the tape is affixed. The outer surface of each wing 12 and the adjacent portions of the side walls or flaps 9 are similarly reinforced with the result that when the formation of the box is completed there is no danger of the box becoming torn along the end creases or at the corners as a result of ordinary handling. The incisions or slots 11 do not extend entirely across the reinforcing tapes but terminate within the areas reinforced thereby. Therefore the walls of the slots are reinforced and the danger of tearing these slots during the shaping of the box or subsequent to the formation of the box is greatly reduced.

When the box is on a shelf for display purposes the end or reinforced wall is the one usually arranged at the front of the shelf. It is this wall that is grasped and pulled forwardly for the purpose of removing the box. As each end wall is reinforced at its top edge by the inturned fold 5 of the tape, the danger of tearing the wall when the box is pulled forwardly is practically eliminated.

Figure 6:
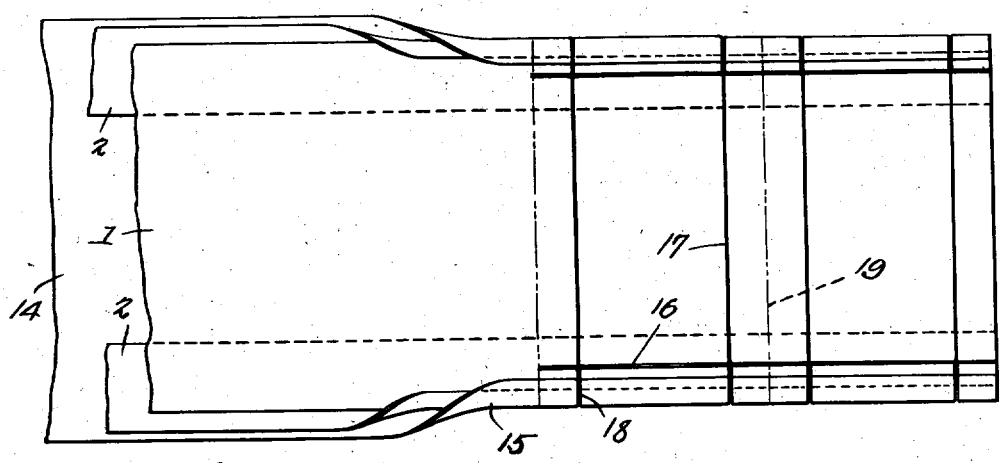
Figure 6 is a plan view of the several webs used in the manufacture of a modified form of box, these webs being illustrated in different stages of the operation of producing a blank.
Figure 7:
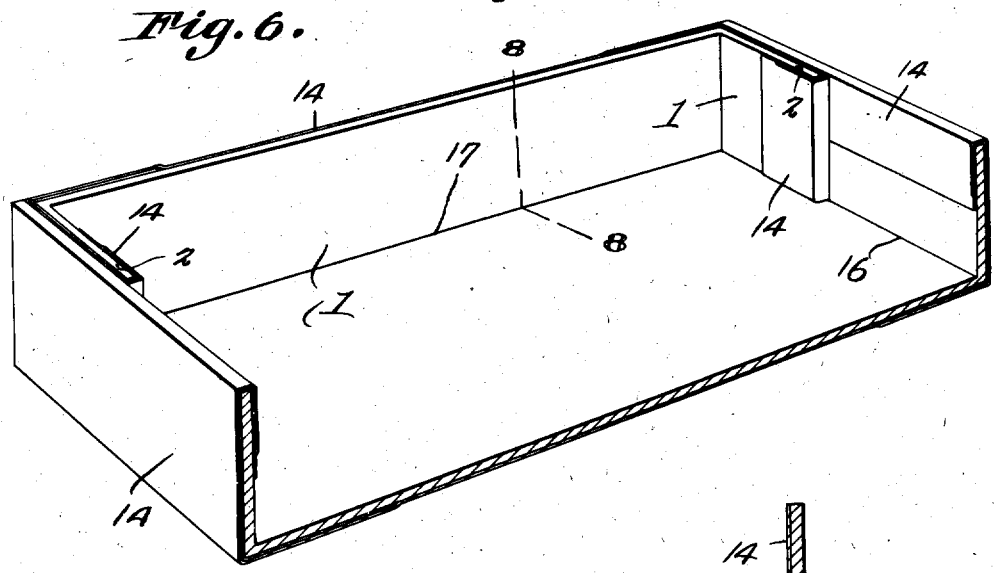
Figure 7 is a perspective view of a portion of a box of the modified construction.
Figure 8:
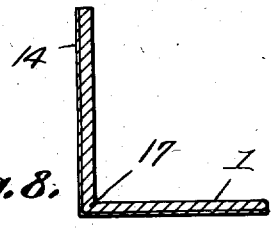
Figure 8 is a section on line 8—8, Figure 7.

Under many conditions it is desirable to provide the box with an outer paper covering and in order that this may be done without adding objectionably to the cost of manufacture it is designed to feed a web 14 of finishing paper so that it will extend across both the web 1 and the tapes 2. While the webs are being assembled during their continuous movement the edges of web 14 are folded over the edges of the tapes 2 so as to lap the edges of the web 1, it being understood that all of the webs are held together by a suitable adhesive. Following the folding of the edge portions of web 14 and tapes 2 as shown at 15 in Figure 6 the webs are scored or creased longitudinally and transversely as at 16 and 17 respectively, formed with side cuts or slits 18 in line with the transverse creases 17, subsequently severed along the lines 19, and then shaped to produce a box a portion of which has been shown in Figure 7, said box comprising a bottom with side and end walls. It will be noted that in the finished box the finishing paper extends over the top edges of the two end walls but is cut off flush with the top edges of the side walls. However as each box is usually displayed on a shelf with one end wall in front, the fact that raw edges of webs 1 and 14 are exposed at the sides will not be objectionable in a box of this grade.

Obviously boxes constructed as described can be made at high speed and at low cost but will retain the durability and strength present only in boxes which have heretofore been produced at much higher cost.

While the present invention has been referred to as a box and a method of making the same it is to be understood that it applies equally as well to other types of containers such as open trays, box lids, etc., and that the term "box" used in the claims is to be construed as covering any type of container to which these improvements can apply.

What is claimed is:

1. The herein described method of producing a box which includes the step of applying to the side edges of a continuously moving web of box-board material continuous adhesive tapes of reinforcing material which are folded over said side edges and are affixed to one surface of the web, subsequently creasing or scoring the web and the tapes longitudinally and transversely to define the bottom, side and end walls of the finished box, then cutting slits into the reinforced side edges along the lines of the transverse scores, said slits terminating at the longitudinal scores, thereafter cutting the web transversely between the slits to provide blanks the end flaps of each of which are formed of the reinforced and slitted side portions of the web, the transverse cuts and the slits cooperating to form wings at opposite sides of each end flap each of which has a reinforced end, and finally shaping the formed blank with the reinforced end walls lapping and affixed to the wings.

2. The herein described method of producing a box which includes the step of applying to the side edges of a continuously moving web of box-board material continuous adhesive tapes of reinforcing material which are folded over said side edges and are affixed to one surface of the web to cover an area greater than the height of the walls of the box to be produced, subsequently creasing or scoring the web and the tapes longitudinally and transversely to define the bottom, side and end walls of the finished box, then cutting slits into the reinforced side edges along the lines of the transverse scores, said slits terminating at the longitudinal scores and being completely surrounded by the reinforcing tape, thereafter cutting the web transversely between the slits to provide blanks the end flaps of each of which are formed of the reinforced and slitted side portions of the web, the transverse cuts and the slits cooperating to form wings at opposite sides of each end flap each of which has a reinforced end, and finally shaping the formed blank with the reinforced end walls lapping and affixed to the wings.

3. The herein described method of producing a box which includes the step of applying to the side edge portions of a continuously moving web of box-board material continuous adhesive tapes of reinforcing material which are affixed to one surface of the web, subsequently creasing or scoring the web and the tapes longitudinally and transversely to define the bottom, side and end walls of the finished box, then cutting slits into the reinforced side edges along the lines of the transverse scores, said slits terminating at the longitudinal scores, thereafter cutting the web transversely between the slits to provide blanks the end flaps of each of which are formed of the reinforced and slitted side portions of the web, the transverse cuts and the slits cooperating to form wings at opposite sides of each end flap each of which has a reinforced end, and finally shaping the formed blank with the reinforced end walls lapping and affixed to the wings.

4. The herein described method of producing a box which includes the step of applying to the side edge portions of a continuously moving web of box-board material continuous adhesive tapes of reinforcing material which are affixed to one surface of the web to cover an area greater than the height of the walls of the box to be produced, subsequently creasing or scoring the web and the tapes longitudinally and transversely to define the bottom, side and end walls of the finished box, then cutting slits into the reinforced side edges along the lines of the transverse scores, said slits terminating at the longitudinal scores and being completely surrounded by the reinforcing tape, thereafter cutting the web transversely between the slits to provide blanks the end flaps of each of which are formed of the reinforced and slitted side portions of the web, the transverse cuts and the slits cooperating to form wings at opposite sides of each end flap each of which has a reinforced end, and finally shaping the formed blank with the reinforced end walls lapping and affixed to the wings.

CLARENCE L. CLAFF.